US010326119B2

(12) United States Patent
Obrist et al.

(10) Patent No.: US 10,326,119 B2
(45) Date of Patent: Jun. 18, 2019

(54) BATTERY SYSTEM

(71) Applicant: Obrist Technologies GmbH, Lustenau (AT)

(72) Inventors: Frank Obrist, Bregenz (AT); Martin Graz, Lustenau (AT); Jochen Bont, Feldkirch (AT)

(73) Assignee: OBRIST TECHNOLOGIES GMBH, Lustenau (AT)

( * ) Notice: Subject to any disclaimer, the term of this patent is extended or adjusted under 35 U.S.C. 154(b) by 134 days.

(21) Appl. No.: 15/514,508

(22) PCT Filed: Sep. 22, 2015

(86) PCT No.: PCT/EP2015/071630
§ 371 (c)(1),
(2) Date: Jul. 24, 2017

(87) PCT Pub. No.: WO2016/046145
PCT Pub. Date: Mar. 31, 2016

(65) Prior Publication Data
US 2017/0352849 A1    Dec. 7, 2017

(30) Foreign Application Priority Data

Sep. 26, 2014    (DE) .................. 10 2014 114 019

(51) Int. Cl.
*H01M 2/00*    (2006.01)
*H01M 2/10*    (2006.01)
(Continued)

(52) U.S. Cl.
CPC ............. *H01M 2/1077* (2013.01); *B60K 6/28* (2013.01); *B60L 1/06* (2013.01); *B60L 3/0046* (2013.01);
(Continued)

(58) Field of Classification Search
CPC .... B60L 1/06; B60L 11/1864; B60L 11/1874; Y10S 903/907; H01M 2/1077; H01M 2/1094; Y02T 10/7005
See application file for complete search history.

(56) References Cited

U.S. PATENT DOCUMENTS 2,812,376 A   11/1957   Yardney
5,393,617 A    2/1995   Klein
(Continued)

FOREIGN PATENT DOCUMENTS

CN       1135266 A    11/1996
CN     101167197 A     4/2008
(Continued)

OTHER PUBLICATIONS

International Search Report (in English) and Written Opinion for International Application No. PCT/EP2015/071630, dated Dec. 23, 2015, 7 pages.
(Continued)

*Primary Examiner* — Cynthia H Kelly
*Assistant Examiner* — Monique M Wills
(74) *Attorney, Agent, or Firm* — Westman, Champlin & Koehler, P.A.

(57) ABSTRACT

The invention relates to a battery system, in particular for a hybrid drive, comprising a housing and a plurality of battery cells arranged within the housing, said cells being combined to give a cell block, wherein a container having a variable inner volume is arranged between the cell block and at least one housing wall, by means of which container the cell block can be braced relative to the housing, wherein the container is filled with a curable or cured medium.

14 Claims, 3 Drawing Sheets

(51) Int. Cl.
*B60L 1/06* (2006.01)
*B60L 3/00* (2019.01)
*B60L 11/18* (2006.01)
*B60K 6/28* (2007.10)
*H01M 2/14* (2006.01)
*H01M 10/04* (2006.01)

(52) U.S. Cl.
CPC ....... *B60L 11/1864* (2013.01); *B60L 11/1874* (2013.01); *B60L 11/1879* (2013.01); *H01M 2/1094* (2013.01); *H01M 2/14* (2013.01); *H01M 10/0481* (2013.01); *B60Y 2200/92* (2013.01); *B60Y 2400/112* (2013.01); *H01M 2220/20* (2013.01); *Y02T 10/7005* (2013.01); *Y02T 10/7061* (2013.01); *Y10S 903/907* (2013.01)

(56) References Cited

U.S. PATENT DOCUMENTS

| | | |
|---|---|---|
| 5,478,363 A | 12/1995 | Klein |
| 5,552,243 A | 9/1996 | Klein |
| 5,585,142 A | 12/1996 | Klein |
| 5,611,823 A | 3/1997 | Klein |
| 5,698,342 A | 12/1997 | Klein |
| 2008/0124625 A1 | 5/2008 | Hock et al. |
| 2012/0070700 A1 | 3/2012 | Kerkamm et al. |
| 2014/0162107 A1 | 6/2014 | Obrist et al. |
| 2015/0295208 A1* | 10/2015 | Schumann ............ H01M 2/02 429/50 |

FOREIGN PATENT DOCUMENTS

| | | |
|---|---|---|
| CN | 201362442 Y | 12/2009 |
| CN | 102412415 A | 4/2012 |
| EP | 2 744 034 A1 | 6/2014 |
| WO | 2013/120770 A1 | 8/2013 |

OTHER PUBLICATIONS

German Search Report for German Patent Application No. 10 2014 114 019.2, dated Jun. 15, 2017, 8 pages.
International Preliminary Report on Patentability for PCT/EP2015/071630, dated Apr. 6, 2017, 18 pages.
Office Action, including Search Report, for Chinese Patent Application No. 201580063625.5, dated Dec. 12, 2018, 7 pages.

* cited by examiner

BATTERY SYSTEM

CROSS-REFERENCE TO RELATED APPLICATION

This Application is a Section 371 National Stage Application of International Application No. PCT/EP2015/071630, filed 22 Sep. 2015 and published as WO 2016/046145 A1 on 31 Mar. 2016, in German, the contents of which are hereby incorporated by reference in their entirety.

The invention relates to a battery system, in particular for a hybrid drive. The invention also relates to a motor vehicle comprising a battery system of this type, and to a production method. A battery system of the type mentioned at the outset is known for example from document EP 2 744 034 A, which can be traced back to the applicant.

The aforementioned document EP 2 744 034 A1 describes a battery system which has a plurality of cell blocks, formed of battery cells, arranged within a housing. A pressure pocket is arranged between the cell blocks and the housing and can be filled with air or nitrogen. Generally, a container having a variable inner volume is thus provided, which is filled with a compressible medium in order to brace the cell block relative to the housing. Although this type of bracing of the individual components of the battery system is thoroughly advantageous, it has been found during the course of further development of the battery system that there are risks for the series production of the battery system. By way of example, there is the risk that the pressure within the pressure pocket will change on account of temperature fluctuations and therefore that different bracing forces will act on the cell blocks. There is additionally the risk that the pressure pocket will lose its seal, for example as a result of ageing effects, and therefore its pressing function. On the whole, it is thus not possible to ensure a bracing within the battery system that is stable in the long term.

One object of the invention is to specify a battery system which is provided with a permanently stable bracing of the individual components. A further object of the invention is to specify a motor vehicle comprising a battery system of this type, and a method for assembling the battery system and for producing a pressure bag for the battery system.

In accordance with the invention, the object in respect of the battery system, the motor vehicle, the assembly method for the battery system, and the method for producing a pressure bag of the battery system are achieved by the subject matter set forth in the claims.

The invention is based on the concept of specifying a battery system, in particular for a hybrid drive, wherein the battery system comprises a housing and a plurality of battery cells arranged within the housing. The battery cells are combined to give a cell block. A container having a variable inner volume is arranged between the cell block and at least one housing wall of the housing. The cell block can be braced relative to the housing by means of the container. In accordance with the invention, the container is filled with a curable or cured plastic.

With the present development of the battery system described in the introduction, the container having the variable inner volume is filled with a medium that can be cured. This is preferably performed under a pressure, such that a pre-bracing is applied to the cell blocks during the assembly of the battery system. In particular, the cell blocks are braced relative to the housing wall. Due to the use of a curable medium, the pre-bracing acts constantly on the cell block once the medium has cured. The cured medium is preferably incompressible, such that for example temperature changes have hardly any influence on the pressure loading for the cell blocks. Lastly, the risk of a leak is also eliminated, since the cured medium is dimensionally stable. Even in the event of damage being caused to the container, the pre-bracing pressure is thus maintained.

The container is preferably a pressure bag. The pressure bag can be formed in particular from two films welded at their edges. The container can be produced in the form of a pressure bag particularly easily and economically.

In a particularly preferred variant of the battery system according to the invention, the housing wall is outwardly deformed, in particular curved. Here, the housing wall exerts a bracing force directed into the housing interior onto the cell block. The bracing force is exerted onto the cell block in particular via the container or via the pressure bag. The pre-bracing force, which acts permanently on the cell block, therefore does not emanate from the container or the curable medium, but is applied permanently by the housing. The curable medium, which is filled under pressure into the container or the pressure bag, deforms the housing wall resiliently, wherein the restoring forces of the housing wall lead to a bracing force, which is directed into the housing interior. The bracing force is transferred from the container or the pressure bag, these being filled in a dimensionally stable manner with the cured medium, to the cell block. This principle for applying a pre-bracing force to the cell block is particularly durable. The outwardly deformed housing wall acts fundamentally in the manner of a leaf spring and pushes onto the container filled with the cured medium, which container forwards this bracing force to the cell block.

The container, in particular the pressure bag, can encase four sides of the cell block. In particular it can be provided that the container or the pressure bag encases an upper side, a lower side, a transverse side and an end side of the cell block. This arrangement of the container or pressure bag is particularly efficient on the one hand in order to achieve a pre-bracing on the cell block from all sides and on the other hand to make the design of the container or the pressure bag as simple as possible. In particular, the arrangement of the container or pressure bag on the opposite upper and lower sides of the cell block leads to advantages with regard to the assembly of the battery system. Due to the two-sided arrangement of the container or pressure bag, it is ensured that the cell block does not shift in the housing as the container or pressure bag is filled with the curable medium.

The container or the pressure bag preferably has a compressive strength of at least 1.5 bar. It is particularly preferable if the compressive strength of the container or the pressure bag corresponds to at least 2 bar, in particular at least 2.5 bar. It is thus ensured that the container or the pressure bag withstands an application of pressure by the curable medium until the medium has completely cured.

A particularly simple production of the container, in particular the pressure bag, is achieved in that the container is formed by two composite films welded to one another at the edge. The two composite films can have substantially the same layer structure or can be formed identically, in order to further simplify the production method.

The composite films advantageously each have a connecting layer, in particular made of polypropylene, and a supporting layer, in particular made of polyamides. It is expedient if the connecting layer can be welded, with polypropylene being particularly well suited for this purpose. The supporting layer serves in particular to stabilise or form a structuring of the composite film. When producing the container or pressure bag, the two composite films are preferably arranged with their connecting layers facing towards one another and are welded to one another by means of a laser beam. Here, a particularly quick scanner laser welding method can be used, whereby the production process for the container or the pressure bag is accelerated.

The container or the pressure bag preferably comprises a supply valve. The supply valve can be arranged or is arranged on an end side of the cell block. The supply valve can be a pinch valve or a check valve. The arrangement of the supply valve on an end side of the cell block is advantageous for production reasons. The cell block thus can be inserted into the housing of the battery system together with the unfilled container or pressure bag. The curable medium can then be filled into the container via an opening in the end side of the housing. In so doing, the container expands and stretches the housing wall of the housing, such that this curves outwardly and is pre-braced. As soon as a sufficient amount of curable medium has been filled into the container, a supply tube for the curable medium can be removed from the supply valve. If the supply valve is formed as a check valve, this automatically prevents the medium from escaping. The housing can then be closed on the end side by means of a terminating cover, such that the battery system is completely assembled.

The curable or cured medium is preferably a plastic. In particular, the medium can be a foam, preferably a high-strength foam, a resin, preferably an epoxy resin, or a gel. The use of a foam has the particular advantage that, once the medium has been filled, it automatically expands and exerts additional pressure onto the housing wall in order to pre-brace this. By contrast, a resin has advantages in respect of the safeguarding against leaks. Even if the container or the pressure bag is damaged or becomes permeable, for example due to ageing reasons, the resin forms a solid block, which maintains the pre-bracing on the housing wall.

The housing can be formed from a steel sheet having a wall thickness between 2 mm and 5 mm. In particular, the wall thickness of the steel sheet can be between 2.5 mm and 4 mm. The use of a steel sheet having a wall thickness of 3 mm is particularly advantageous. The steel sheet is preferably made of spring steel so as to be able to exert a resilient pre-bracing force onto the cell block. The use of high-strength fine-grain structural steels as material for the housing is conceivable in particular. Generally, the steel sheet used for the housing should have a minimum yield point $R_{p0.2}$ of >500. The tensile strength $R_m$ should be at least 400. Particularly good resilient properties which are suitable for pre-bracing the cell block are possessed by a steel which has the material number 1.0060 in accordance with the standard DIN EN 10027-2:2013-09. Steels of this type are also known under the short names ST60-2 and E335.

In accordance with a coordinated aspect, the invention is based on the concept of specifying a motor vehicle, in particular hybrid vehicle, comprising at least one previously described battery system.

A further coordinated aspect of the invention relates to a method for assembling the previously described battery system. The following steps are carried out in the method according to the invention:

a) arranging a middle region of the container, in particular the pressure bag, on a transverse side of a cell block;
b) folding over the edge regions of the container, in particular the pressure bag, protruding beyond the upper side, and placing one edge region on an upper side of the cell block and one edge region on a lower side of the cell block;
c) folding over a front region of the container, in particular the pressure bag, protruding beyond the middle region, and placing the front region against an end side of the cell block;
d) arranging the cell block encased by the container, in particular the pressure bag, in the housing;
e) filling a curable medium into the container, in particular into the pressure bag, under pressure; and
f) curing the medium.

The method according to the invention makes it possible, in a particularly simple way, to produce a battery system in which the cell blocks within the housing are braced. Here, the bracing force which acts on the cell blocks is exerted permanently by the housing. The filling of the curable medium indeed brings about a temporary pressure increase in the container, which is caused by the medium. In addition, further pressure can be exerted via the curing process of the medium. The pressure within the container brings about an expansion of the housing, which is resiliently pre-braced in this way. The housing or the housing wall pushes back into the original state and thus exerts a bracing force onto the cell block.

The curable medium is preferably filled at a pressure between 0.3 bar and 2 bar. In particular, it is provided that the pressure as the curable medium is filled is between 0.35 bar and 1.5 bar, in particular between 0.4 bar and 1 bar, preferably between 0.45 bar and 0.7 bar, and particularly advantageously corresponds to a filling pressure of 0.5 bar.

When filling and/or curing the curable medium, the housing is advantageously resiliently deformed. The resilient deformation occurs in particular at the housing walls associated with the edge regions of the container or pressure bag. Specifically, it is thus provided that the upper side and the lower side of the housing are resiliently deformed in order to trigger a bracing force which acts in the housing interior.

Within the scope of the present invention, a method for producing a pressure bag or a battery system described in the introduction is also disclosed and claimed, in which method two composite films are arranged substantially congruently on one another and are welded to one another at their edges. The welding is preferably performed by a laser beam. This production method can be implemented in a particularly simple and economical manner and is therefore well-suited for series manufacture.

The edges of the composite films can be welded by a scanner laser welding method. Here, it can also be provided to connect the composite films with two weld seams, wherein the weld seams run at a constant distance from one another. This forms an additional protection against leaks. In particular, a redundancy is thus created, such that a tightness of the pressure bag is ensured even if one of the weld seams leaks.

The invention will be explained in greater detail hereinafter on the basis of an exemplary embodiment with reference to the accompanying, schematic drawings, in which FIG. 1 shows a perspective view of a container, in particular a pressure bag, for the battery system according to the invention;

Figure 1:
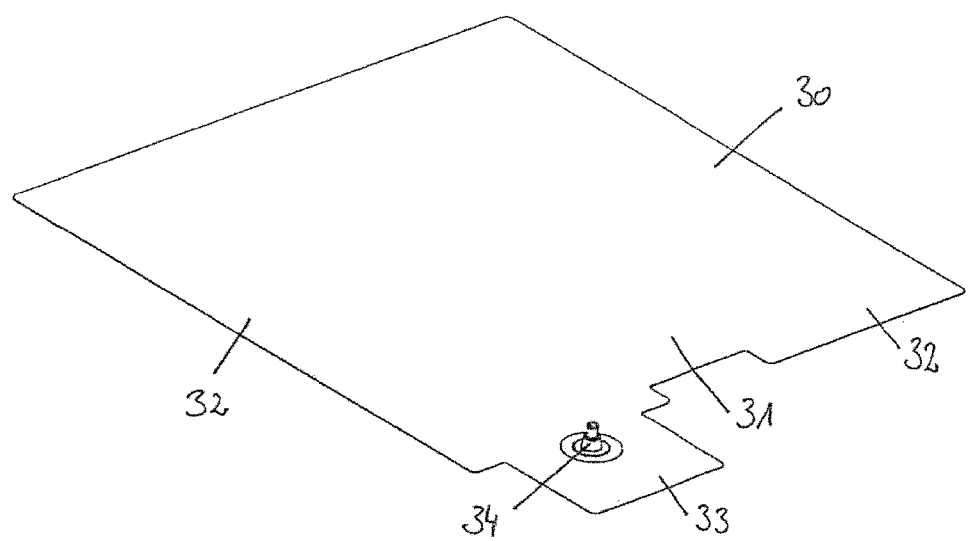

A container having a variable internal volume and which is preferably formed as a pressure bag 30 is shown by way of example in FIG. 1. The pressure bag 30 is substantially pocket-like or cushion-like and is formed by two composite films, which are welded to one another at their edges. The pressure bag 30 has a geometry which can be divided into a middle region 31, two edge regions 32, and a front region 33. The front region 33 starts here from one of the edge regions 32. The edge regions 32 are separated from one another by the middle region 31. A supply valve 34 is arranged in the front region 33. The supply valve 34 is formed substantially as a check valve and is fixedly connected, for example adhesively bonded or welded, to the pressure bag 30.

The pressure bag can be filled with a curable medium 35, preferably a plastic. In particular, a foam or a resin, for example epoxy resin, is used as curable medium 35. Here, the pressure bag 30 expands and transfers the filling pressure of the medium 35 in the form of a pre-bracing force to surrounding components. In particular, the pressure bag 30 can exert a pre-bracing force onto a housing 11 of the battery system 10 as a result of the filling pressure of the medium 35.

Figure 2:
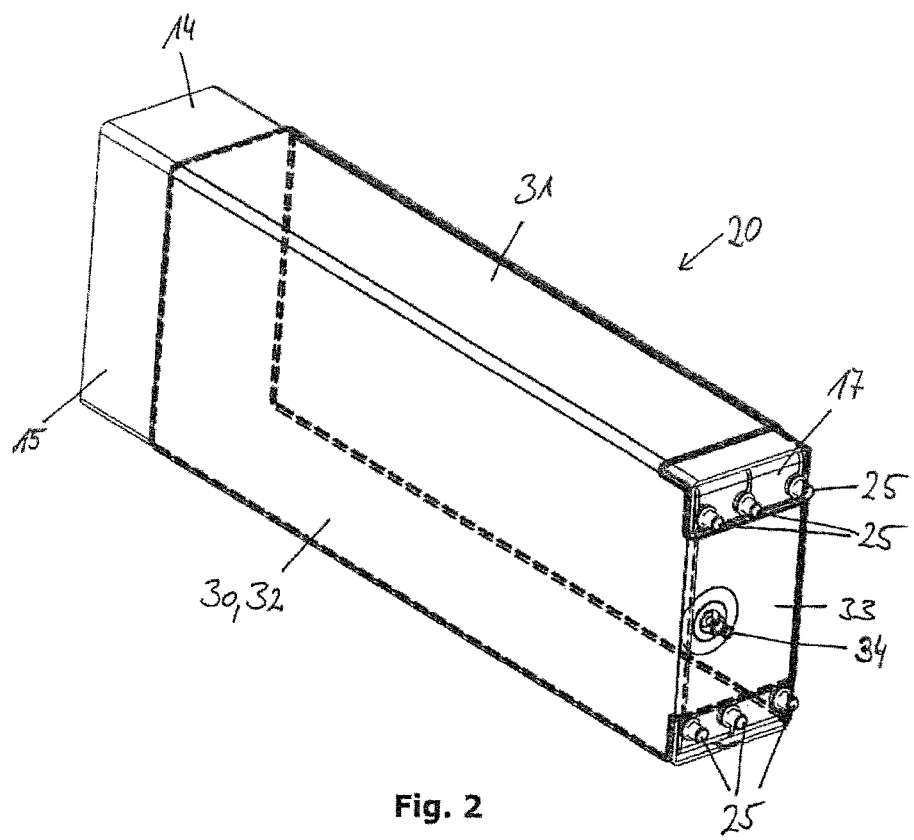
FIG. 2 shows a perspective view of a cell block of a battery system according to the invention with the container or pressure bag according to FIG. 1.

The arrangement of the pressure bag 30 in a battery system 10 can be clearly seen in FIG. 2. FIG. 2 shows a perspective view of a cell block 20 of the battery system 10, which also comprises a housing 11 having a housing wall 12. FIG. 2 shows the pressure bag 30, which is arranged around the cell block 20. The pressure bag 30 according to FIG. 2 corresponds to the pressure bag as is illustrated in FIG. 1. In particular, the pressure bag 30 comprises the two edge regions 32, the middle region 31, and the front region 33.

In the assembled state of the battery system 10, the middle region 31 of the pressure bag 30 extends over a transverse side 14 of the cell block 20.

The two edge regions 32 extend one over an upper side 15 and one over a lower side 16 of the cell block 20. The front region 33 arranged on one of the edge regions 32 is arranged in a manner lying against the end side 17 of the cell block 20. The pressure bag 30 in essence thus has four sides folded around the cell block 20 and can brace this efficiently in the housing 11.

Figure 5:
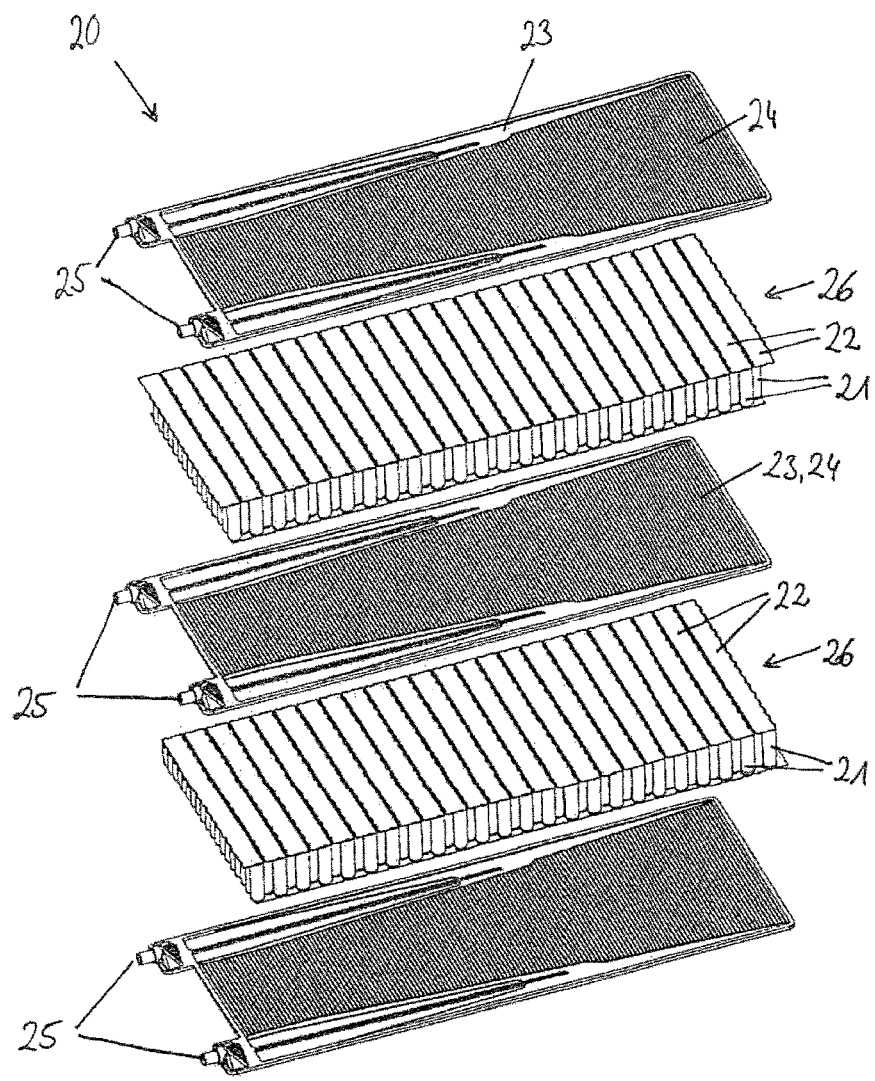
FIG. 5 shows a perspective exploded view of a cell block of the battery system according to FIG. 2.

As can also be seen in FIG. 2, a plurality of fluid connectors 25 are arranged on the end side 17 of the cell block 20. The fluid connectors 25 are coupled to cooling elements 23 arranged within the cell block 20, said cooling elements being used in order to cool the battery cells 21. The inner design of the cell block 20 will be explained in greater detail in conjunction with FIG. 5.

Figure 3:
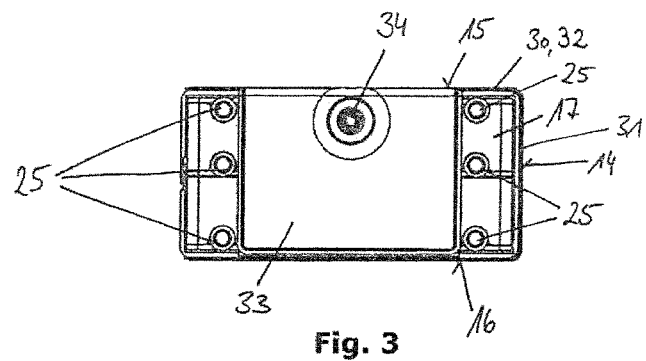
FIG. 3 shows a front view of the cell block according to FIG. 2.

FIG. 3 shows the cell block 20 in a front view, wherein the covering of the cell block 20 by the pressure bag 30 can be seen again. The supply valve 34 is arranged on the front region 33 and therefore on the same end side 17 which also carries the fluid connectors 25. All connections and supply valves 34 to be supplied with a fluid are thus all provided on the same side of the cell block 20. The electrical connections of the cell block 20, which is preferably formed as a high-voltage cell block 20, are advantageously arranged on an opposite end side of the cell block 20. An efficient separation between high-voltage region and fluid connector region is thus made possible.

Figure 4A:
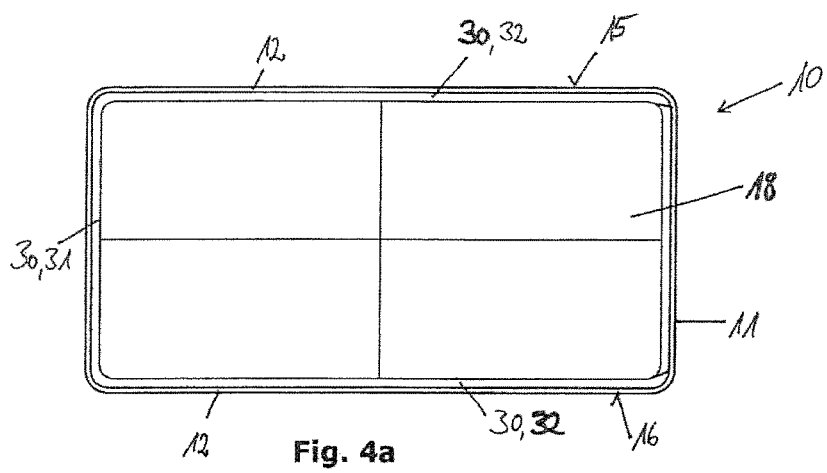
FIG. 4a shows a cross-sectional view through the housing of a battery system with the cell block according to FIG. 2 prior to filling the curable medium into the pressure bag.
Figure 4B:
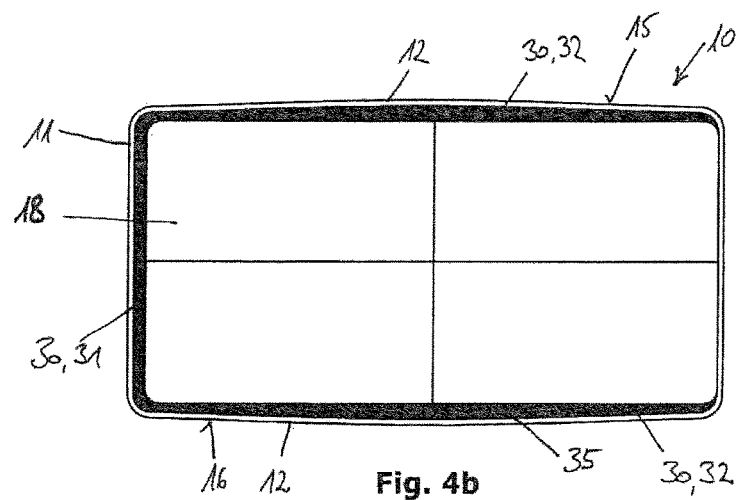
FIG. 4b shows a cross-sectional view through the housing of a battery system with the cell block according to FIG. 2 after the curable medium has been filled into the pressure bag.

The cross-sectional view according to FIGS. 4a and 4b explains the principle of the invention, which is implemented in the illustrated exemplary embodiment. Here, FIG. 4a shows the housing 11 with an interior 18, in which a cell block 20 can be arranged and an unfilled pressure bag 30 is placed around the upper side 15, the lower side 16, and the transverse side 14.

Generally, it is provided in the case of the invention that the pressure bag 30 is filled by a curable medium 35, which cures over time, preferably over a period of a few hours, and thus forms a solid pre-bracing layer. The curable, initially liquid medium 35 is introduced into the pressure bag 30 under a pressure, once the pressure bag 30 has been arranged around the cell block 20 and inserted together with the cell block 20 into the housing 11. The housing 11 deforms due to the pressure within the pressure bag 30. This is clearly illustrated in FIG. 4b. This figure shows the same section as FIG. 4a, wherein the pressure bag is now filled with the curable medium. The housing wall 12 now curves outwardly, in particular on the upper side 15 and the lower side 16.

The housing 11 has a housing wall 12, which is preferably formed from a steel sheet. The steel sheet expands in the resilient region under the pressure in the pressure bag 30 or curves outwardly. The steel sheet or the housing wall 12 is thus pre-braced in a spring-like manner. This results in a restoring force, which acts as a bracing force into the interior 18 of the housing 11. Here, in particular the relatively broader upper and lower sides 15, 16 of the housing 11 are curved outwardly. The outward curving of the upper and lower sides 15, 16 at the same time causes a stretching force to be exerted onto the transverse side 14, along which the middle region 31 of the pressure bag 30 extends, which stretching force counteracts an outward curving of the transverse side 14. As can be seen in FIG. 4b, the transverse side 14 of the housing 11 therefore is not significantly deformed by the filling of the curable medium.

Since the two edge regions 32 of the pressure bag 30 of substantially equal volume are arranged along the upper side 15 and the lower side 16, the cell block 20 is prevented from being displaced within the housing as the curable medium 35 is filled into the pressure bag 30. The upper side 15 and the lower side 16 are curved outwardly due to the pressure in the pressure bag 30, wherein the curvature at the apex has a height relative to the originally flat orientation of the upper side 15 or lower side 16 corresponding at least to the wall thickness of the housing wall 12. In other words, the curvature at the apex can have a height which is at least 3 mm. In practice, it has been found that the height of the outward curvature at the apex is approximately 5 mm, so that the total height of the housing after having been filled with the curable medium (FIG. 4b) is approximately 10 mm greater than before it was filled with the curable medium (FIG. 4a).

For clarification, the structure of a cell block 20 which is integrated into the housing 11 of the battery system 10 is illustrated in FIG. 10. The cell block 20 comprises two battery layers 26, which are assembled from a plurality of battery cells 21. The battery cells 21 are formed as round cells and are mechanically and electrically connected to one another at their poles by contact plates 22. Here, the battery cells 21 are coupled to one another in parallel and series connection. The cell block 20 also has three cooling elements 23 in the form of cooling bags, wherein in each case two cooling elements 23 enclose a battery layer 26 between them. The cooling elements 23 here rest with heat-conductive contact on the contact plates 22. At their longitudinal ends, the cooling elements 23 each comprise two fluid connectors 25, which enable the connection of the cooling elements 23 to a cooling circuit.

A channel structure 24 is provided within the cooling elements 23 and ensures a uniform flow through the cooling elements 23 and therefore a uniform dissipation of heat. The cooling elements 23, together with the battery cells 21, form the cell block 20. This is encased on four sides by the pressure bag 30 during the assembly of the battery system 10 and is inserted into the housing 11 together with the pressure bag 30. The pressure bag 30 is then filled with the curable medium 25, wherein a filling pressure is set which leads to an outward curving of the housing walls 12. The housing 11 creates a bracing force on account of restoring forces in the housing wall 12, which bracing force acts on the cell block 20 and thus ensures a reliable, heat-conductive contact between the cooling elements 23 and the battery layers 26.

LIST OF REFERENCE SIGNS

10 battery system
11 housing
12 housing wall
14 transverse side
15 upper side
16 lower side
17 end side
18 interior
20 cell block
21 battery cell
22 contact plate
23 cooling element
24 channel structure
25 fluid connector
26 battery layer
30 pressure bag
31 middle region
32 edge region
33 front region
34 supply valve

The invention claimed is:

1. A battery system comprising a housing and a plurality of battery cells arranged within the housing, said battery cells being combined to give a cell block, wherein a container having a variable inner volume is arranged between the cell block and at least one housing wall, by means of which container the cell block can be braced relative to the housing, and wherein the container is filled with curable or cured medium comprising at least one of plastic, foam, resin, epoxy resin and gel,
characterized in that
the housing wall is outwardly deformed, curved, and exerts a bracing force directed into the housing interior onto the cell block via the container, the container comprising a pressure bag.

2. The battery system according to claim 1,
characterized in that
the pressure bag, encases four sides, a transverse side, an upper side, a lower side, and an end side, of the cell block.

3. The battery system according to claim 1,
characterized in that
the pressure bag, has a compressive strength of at least 1.5 bar.

4. The battery system according to claim 1,
characterized in that
the pressure bag, is formed by two composite films welded to one another at the edge.

5. The battery system according to claim 4,
characterized in that
the composite films each have a connecting layer made of polypropylene, and a supporting layer made of polyamide.

6. The battery system according to claim 1,
characterized in that
the pressure bag, comprises a supply valve, comprising a pinch valve or a check valve, which can be arranged or is arranged on an end side of the cell block.

7. The battery system according to claim 1,
characterized in that
the medium is a plastic, comprising a foam, a resin, an epoxy resin, or a gel.

8. The battery system according to claim 1,
characterized in that
the housing is formed from a steel sheet which has a wall thickness between 2 mm and 5 mm.

9. A motor vehicle, in particular hybrid vehicle, comprising at least one battery system according to claim 1.

10. A method for assembling a battery system according to claim 1, wherein the following steps are carried out:
a) arranging a middle region of the pressure bag, on a transverse side of a cell block;
b) folding over the edge regions of the pressure bag, protruding beyond the upper side, and placing one edge region on an upper side of the cell block and one edge region on a lower side of the cell block;
c) folding over a front region of the pressure bag, protruding beyond the middle region, and placing the front region against an end side of the cell block;
d) arranging the cell block encased by the pressure bag, in the housing;
e) filling a curable medium into the pressure bag, under pressure; and
f) curing the medium.

11. The method for assembling a battery system according to claim 10,
characterized in that
the pressure as the curable medium is filled is between 0.3 bar and 2 bar.

12. The method for assembling a battery system according to claim 10,
characterized in that
when filling and/or curing the curable medium, the housing is resiliently deformed at least at the housing walls associated with the edge regions of the pressure bag.

13. The method for producing a pressure bag for a battery system according to claim 1, wherein two composite films are arranged substantially congruently on one another and are welded to one another at their edges, wherein the welding is performed by a laser beam.

14. The method according to claim 13,
characterized in that
the composite films are connected with weld seams which run at a constant distance from one another.

* * * * *